(12) United States Patent
Suzuki et al.

(10) Patent No.: US 9,068,549 B2
(45) Date of Patent: Jun. 30, 2015

(54) GLOW PLUG WITH PRESSURE SENSOR

(71) Applicant: NGK SPARK PLUG CO., LTD., Nagoya-shi, Aichi (JP)

(72) Inventors: Hiroyuki Suzuki, Kasugai (JP); Akimitsu Sassa, Tokai (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 14/364,225

(22) PCT Filed: Apr. 26, 2013

(86) PCT No.: PCT/JP2013/002838
§ 371 (c)(1),
(2) Date: Jun. 10, 2014

(87) PCT Pub. No.: WO2013/164909
PCT Pub. Date: Nov. 7, 2013

(65) Prior Publication Data
US 2014/0373799 A1  Dec. 25, 2014

(30) Foreign Application Priority Data
May 2, 2012  (JP) .................................. 2012-105088

(51) Int. Cl.
*F23Q 7/00* (2006.01)
*F02P 19/02* (2006.01)
(Continued)

(52) U.S. Cl.
CPC ................. *F02P 19/028* (2013.01); *F23Q 7/00* (2013.01); *F23Q 7/22* (2013.01); *F23Q 7/001* (2013.01); *F23Q 2007/002* (2013.01); *G01L 7/082* (2013.01); *G01M 15/08* (2013.01)

(58) Field of Classification Search
CPC ..... F23Q 7/00; F23Q 7/001; F23Q 2007/002; F23Q 2007/004; F23Q 2007/005; F02P 19/028
USPC .................................................. 123/145 A
See application file for complete search history.

(56) References Cited

U.S. PATENT DOCUMENTS 8,429,956 B2 * 4/2013 Borgers et al. ............. 73/114.18
8,567,237 B2 * 10/2013 Maeda et al. ............. 73/114.18
(Continued)

FOREIGN PATENT DOCUMENTS

JP  2005-331236 A  12/2005
JP  2006-010306 A  1/2006
(Continued)

OTHER PUBLICATIONS

International Search Report for PCT/JP2013/002838 dated Jul. 16, 2013.

*Primary Examiner* — Hung Q Nguyen
(74) *Attorney, Agent, or Firm* — Sughrue Mion, PLLC

(57) ABSTRACT

A coupling member (180) of a glow plug (100) includes a first bend (183) and a second bend (184) folded in an axis direction OD and a joint section (185) in a tapered shape configured to connect the first bend with the second bend and reduce the diameter toward a rear end side of a body portion. Accordingly, in a limited space formed between a housing (130) and a heater unit (150), this configuration increases the length of the coupling member (180), compared with a configuration without any bend folded in the axis direction OD. This results in decreasing the spring constant k of the coupling member 180 and suppressing extension of the coupling member 180 in the axis direction due to thermal expansion.

7 Claims, 11 Drawing Sheets

(51) Int. Cl.
*F23Q 7/22* (2006.01)
*G01L 7/08* (2006.01)
*G01M 15/08* (2006.01)

(56) References Cited

U.S. PATENT DOCUMENTS

| | | | |
|---|---|---|---|
| 2005/0252297 A1* | 11/2005 | Heinzelmann et al. | 73/708 |
| 2006/0053875 A1* | 3/2006 | Haussner et al. | 73/116 |
| 2007/0289370 A1 | 12/2007 | Hirose et al. | |
| 2008/0223139 A1* | 9/2008 | Hirose et al. | 73/715 |
| 2008/0302323 A1* | 12/2008 | Kern et al. | 123/145 A |
| 2011/0005308 A1* | 1/2011 | Kern et al. | 73/114.16 |
| 2011/0240628 A1 | 10/2011 | Goretti et al. | |

FOREIGN PATENT DOCUMENTS

| | | |
|---|---|---|
| JP | 2008-002809 A | 1/2008 |
| JP | 2009-527749 A | 7/2009 |
| JP | 2010-133603 A | 6/2010 |
| WO | 2011/116366 A1 | 9/2011 |

* cited by examiner

GLOW PLUG WITH PRESSURE SENSOR

CROSS REFERENCE TO RELATED APPLICATIONS

This application is a National Stage of International Application No. PCT/JP2013/002838 filed Apr. 26, 2013, claiming priority based on Japanese Patent Application No. 2012-105088, filed May 2, 2012, the contents of all of which are incorporated herein by reference in their entirety.

TECHNICAL FIELD

The present invention relates to a glow plug and more specifically to a glow plug with a built-in pressure sensor.

BACKGROUND ART

A glow plug is used as an assisting heat source in internal combustion engines of the compression ignition system, such as Diesel engines. The glow plug includes: for example, a heater configured to heat a combustion chamber in an internal combustion engine; a pressure sensor configured to measure the pressure in the combustion chamber; and a coupling member in a thin film shape joined with the heater and with a housing and configured to hold the heater in a displaceable manner in an axis line direction of the glow plug. In this glow plug, the pressure sensor detects a load applied to the pressure sensor by displacement of the heater according to a change in pressure in the combustion chamber.

CITATION LIST

Patent Literature

PTL 1: JP 2005-331236A

SUMMARY OF INVENTION

Technical Problem

During measurement of the combustion pressure, the coupling member may be heated according to a change in environmental temperature and may be thermally expanded in an axis direction. Since the heater is held by the coupling member, extension of the coupling member in the axis direction due to thermal expansion is transmitted to the pressure sensor via the heater. As a result, a different load from the load which the heater applies to the pressure sensor according to a change in combustion pressure is applied to the pressure sensor. This causes a deviation in measurement value of the pressure sensor and thereby causes a deterioration of the measurement accuracy of the pressure sensor.

The extension of the coupling member in the axis direction due to thermal expansion is not limited to during measurement of the combustion pressure described above but may be caused according to various environmental changes.

By taking into account the problems described above, the object of the invention is directed to a glow plug with a pressure sensor and is to suppress extension of a coupling member in an axis direction due to thermal expansion during measurement of the pressure and improve the measurement accuracy of the pressure sensor.

Solution to Problem

In order to solve at least part of the problems described above, the invention provides aspects and embodiments described below.

Aspect 1:
A glow plug with a pressure sensor comprising: a housing in a cylindrical shape that is extended in a direction of an axis line; a heater unit in a rod shape that has a rear end part placed in the housing and a front end part protruded from a front end of the housing and is movable along the direction of the axis line; a coupling member in a thin film shape that is connected at one end with the housing and at the other end with the heater unit and is configured to enable the heater unit to move along the direction of the axis line and couple the heater unit with the housing; and a pressure sensor that detects a pressure based on a load transmitted via the heater unit, wherein the coupling member includes: a first bend and a second bend folded in the direction of the axis line; and a joint section in a tapered shape configured to connect the first bend with the second bend and reduce diameter toward a rear end side of the housing, wherein the first bend is located closer in a direction orthogonal to the axis line to the housing than the second bend and is located closer in the direction of the axis line to a front end side of the housing than the second bend, and the first bend has a greater bend radius than a bend radius of the second bend.

In the glow plug with the pressure sensor according to Aspect 1, the coupling member includes the first bend and the second bend respectively folded in the direction of the axis line, and the joint section in the tapered shape configured to connect the first bend with the second bend and reduce the diameter toward the rear end side of the housing. Accordingly, in a limited space formed between the housing and the heater unit, this configuration increases the length of the coupling member, compared with a configuration without any bend folded in the direction of the axis line. This results in decreasing the spring constant of the coupling member and suppressing extension of the coupling member in the direction of the axis line due to thermal expansion according to a environmental change. This accordingly prevents an unnecessary load due to the extension of the coupling member in the direction of the axis line from being applied to the pressure sensor via the heater unit and improves the measurement accuracy of the pressure sensor. In the glow plug with the pressure sensor according to Aspect 1, the first bend is formed to have a greater bend radius than the bend radius of the second bend. Accordingly, this configuration reduces the stress acting on the coupling member or more specifically on the first bend, compared with a coupling member formed to have substantially no difference in bend radius between the first bend and the second bend. This arrangement suppresses degradation of the durability of the coupling member accompanied with a decrease in spring constant of the coupling member, thus improving the durability of the coupling member and thereby the durability of the glow plug with the pressure sensor, along with improvement in measurement accuracy of the pressure sensor.

Aspect 2:
The glow plug with the pressure sensor according to Aspect 1, wherein the second bend is bent in an opposite direction to a bend direction of the first bend.

In the glow plug with the pressure sensor according to Aspect 2, the second bend is bent in the opposite direction to the bend direction of the first bend. This simple configuration enables an increase in length of the coupling member and a decrease in spring constant of the coupling member.

Aspect 3:
The glow plug with the pressure sensor according to Aspect 1, wherein the coupling member further includes: a first cylinder section connected with the housing, configured to have a first outer diameter and formed in a cylindrical shape along the direction of the axis line; and a second cylinder section connected with the heater unit, configured to have a second outer diameter that is smaller than the first outer diameter and formed in a cylindrical shape along the direction of the axis line, wherein when a side of the axis line is specified as inward and an opposite side to the axis line is specified as outward in a radial direction orthogonal to the axis line, the first bend is formed to be connected with an opposite end of the first cylinder section that is opposite to an end connected with the housing and to be folded inward in the radial direction, and the second bend is formed to be connected with an opposite end of the second cylinder section that is opposite to an end connected with the heater unit and to be folded outward in the radial direction.

In the glow plug with the pressure sensor according to Aspect 3, the coupling member includes the first cylinder section configured to have the first outer diameter and formed in the cylindrical shape along the direction of the axis line, and the second cylinder section configured to have the second outer diameter that is smaller than the first outer diameter and formed in the cylindrical shape along the direction of the axis line. The coupling member is accordingly formed in a Z shape where the cross section along the direction of the axis line is inclined at 90 degrees to the axis line. This configuration relatively reduces the size of the coupling member and thereby increases the flexibility in design of the glow plug with the pressure sensor.

Aspect 4:

The glow plug with the pressure sensor according to any one of Aspects 1 to 3, wherein the joint section has an inclination equal to or greater than 10 degrees to a reference plane that is in contact with the second bend and is orthogonal to the axis line.

In the glow plug with the pressure sensor according to Aspect 4, the joint section is formed to have an inclination equal to or greater than 10 degrees to the reference plane that is in contact with the second bend and is orthogonal to the axis line. This configuration decreases the spring constant, compared with a coupling member where the angle of the joint section to the reference plane is less than 10 degrees. This results in improving the measurement accuracy of the pressure sensor.

Aspect 5:

The glow plug with the pressure sensor according to Aspect 4, wherein the joint section has an inclination equal to or less than 35 degrees to the reference plane.

In the glow plug with the pressure sensor according to Aspect 5, the joint section is formed to have an inclination equal to or less than 35 degrees to the reference plane. This configuration decreases the spring constant, compared with a coupling member where the angle of the joint section to the reference plane is greater than 35 degrees. This results in improving the measurement accuracy of the pressure sensor.

Aspect 6:

The glow plug with the pressure sensor according to any one of Aspects 1 to 5, wherein the first bend has a greater thickness than a thickness of the second bend.

The glow plug with the pressure sensor according to Aspect 6 reduces the stress focused on the first bend in the case of displacement of the heater unit by a combustion pressure and optimizes the stress acting on the first bend and the stress acting on the second bend, thus improving the durability of the coupling member.

Aspect 7:

The glow plug with the pressure sensor according to any one of Aspects 1 to 6, wherein the coupling member is formed by a drawing process.

In the glow plug with the pressure sensor according to Aspect 7, the coupling member is formed by the drawing process. This improves the cost performance of the coupling member and ensures manufacture of the coupling member of the stable quality with a less variation in shapes of the first bend, the second bend and the joint section.

Any of the various aspects of the invention described above may be appropriately combined or partly omitted.

DESCRIPTION OF EMBODIMENTS

A. First Embodiment

A1. Schematic Configuration of Glow Plug

Figure 1A:
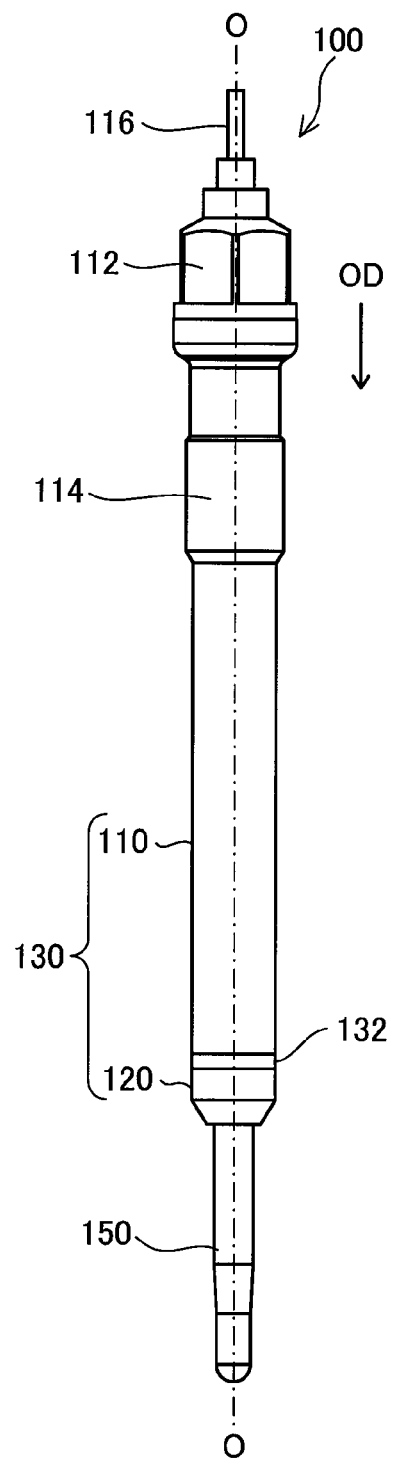
FIG. 1A is a diagram illustrating the configuration of a glow plug 100 according to a first embodiment.
Figure 1B:
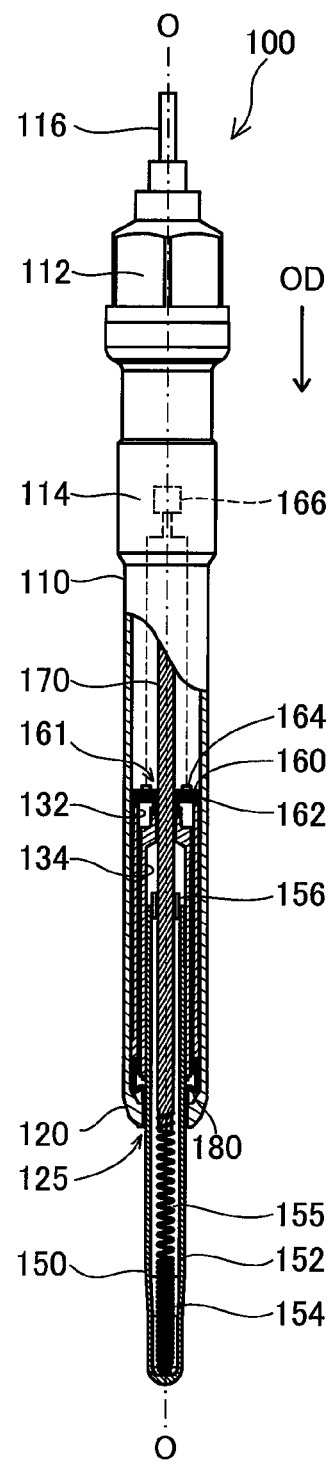
FIG. 1B is a diagram illustrating the configuration of a glow plug 100 according to a first embodiment.
Figure 2:
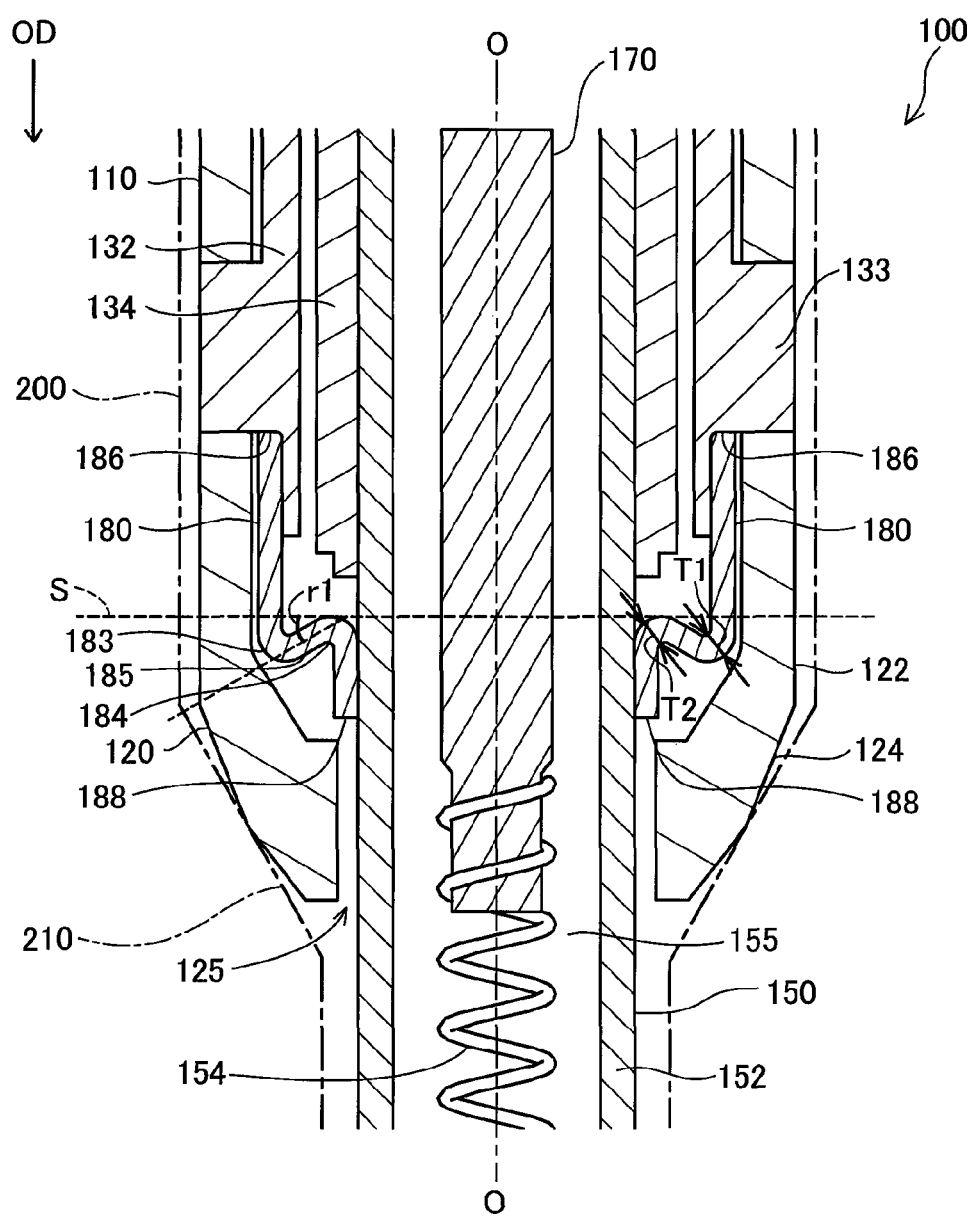
FIG. 2 is an enlarged cross sectional view of the neighborhood of a cap unit 120.

FIGS. 1A and 1B are diagrams illustrating the configuration of a glow plug 100 according to a first embodiment. FIG. 1A illustrates the general configuration of the glow plug 100, and FIG. 1B illustrates its partial sectional configuration. FIG. 2 is an enlarged cross sectional view of the neighborhood of a cap unit 120 described later. In the description below, the lower side of an axis line O of the glow plug 100 in FIGS. 1A, 1B and 2 is specified as a front end side of the glow plug 100, and the upper side is specified as a rear end side. A downward direction along the axis line O of the glow plug 100 is specified as an axis direction OD. As illustrated in FIGS. 1A and 1B, the glow plug 100 includes a housing 130 having a metal shell 110 and a cap unit 120, and a heater unit 150. The metal shell 110 herein is also called "body portion" and the cap unit 120 is also called "head portion".

The metal shell 110 is a substantially cylindrical metal member made of carbon steel or stainless steel. A tool engagement structure 112 configured to engage a tool used for attachment of the glow plug 100 to an internal combustion engine is formed at a rear end of the metal shell 110. A threaded section 114 with thread grooves (not shown) formed for fixation of the glow plug 100 to a cylinder head is provided on the front end side of the tool engagement structure 112. A plurality of wirings 116 which are electrically connected with an integrated circuit 166 (described later) and a center shaft 170 (described later) in the housing 130 are inserted at the rear end of the tool engagement structure 112.

The cap unit 120 is placed at the front end of the metal shell 110. The cap unit 120 is a ring-shaped metal member made of carbon steel or stainless steel. As illustrated in FIG. 2, a cylindrical section 122 having a substantially constant outer diameter is formed on the rear end side of the cap unit 120, and a tapered section 124 tapered toward the front end is formed on the front end side.

The heater unit 150 includes a sheath tube 152, a heating coil 154 and insulating powder 155. The sheath tube 152 is made of, for example, stainless steel having excellent heat resistance and corrosion resistance and has a closed hemispherical front end and an open rear end in the metal shell 110. The heating coil 154 is a winding resistance and is placed inside of the front end of the sheath tube 152. The center shaft 170 that is a rod-shaped metal member is inserted in the heater unit 150, and a rear end of the heating coil 154 is fixed to a front end of the center shaft 170. Electric power is externally supplied through the wirings 116 and the center shaft 170 to the heating coil 154. The insulating powder 155 of, for example, magnesium oxide, having heat resistance is packed in a gap from the heating coil 154 in the sheath tube 152. A seal member 156 for sealing the insulating powder 155 in the sheath tube 152 is inserted between the open rear end of the sheath tube 152 and the center shaft 170. The sheath tube 152 is formed by swaging process, which enhances the compactness of the insulating powder 155 packed inside thereof and improves the heat conduction efficiency. The heater unit 150 of this configuration has the rear end side placed in the metal shell 110 and the front end side placed to be protruded from an opening 125 of the cap unit 120 toward the axis direction OD.

In the housing 130, there are provided: the ring-shaped pressure sensor 160 (see FIG. 1B) placed on the rear end side of the heater unit 150; a sensor fixation member 132 configured to fix the pressure sensor 160 in the housing 130; a transmission sleeve 134 configured to transmit a displacement of the heater unit 150 along the axis line O to the pressure sensor 160; and the coupling member 180 configured to couple the outer periphery of the heater unit 150 with the inside of the housing 130.

The sensor fixation member 132 is a substantially cylindrical member made of, for example, stainless steel. The sensor fixation member 132 is placed along the inner circumference of the metal shell 110, and a brim-like flange 133 is formed in the neighborhood of its front end. The flange 133 is welded to a front end face of the metal shell 110 and to a rear end face of the cap unit 120. The outer periphery of the pressure sensor 160 is welded to the rear end of the sensor fixation member 132. According to this embodiment, the pressure sensor 160 is fixed in the vicinity of the middle portion in the housing 130 by this sensor fixation member 132.

The transmission sleeve 134 is a substantially cylindrical member made of, for example, stainless steel. The transmission sleeve 134 is placed between the sensor fixation member 132 and the heater unit 150. A front end of the transmission sleeve 134 is welded to the outer periphery of the heater unit 150 in the vicinity of a position where the flange 133 of the sensor fixation member 132 is formed. A rear end of the transmission sleeve 134 is welded to the inner circumference of the ring-shaped pressure sensor 160. The displacement of the heater unit 150 along the axis line O is transmitted to the inner circumference of the pressure sensor 160 by this transmission sleeve 134.

The coupling member 180 is connected at one end 186 with the housing 130 and is connected with the heater unit 150 at a different end 188 that is different from the end 186, so as to enable the heater unit 150 to move along the axis line O and couple the heater unit 150 with the housing 130. The coupling member 180 is made of, for example, stainless steel or a nickel alloy in a thin film shape to have elasticity.

In general, during measurement of the combustion pressure, the coupling member 180 is thermally expanded with an increase of the temperature in a combustion chamber. The coupling member 180 is extended in the direction of the axis line O, accompanied with thermal expansion. Such extension in the direction of the axis line O is transmitted to the coupled heater unit 150 as an unnecessary load, i.e., a load other than a load that is transmitted to a pressure sensor by displacement of the heater unit 150 corresponding to a change in combustion pressure. This may result in deteriorating the measurement accuracy of the pressure sensor 160. A decrease in spring constant k of the coupling member 180 suppresses extension of the coupling member 180 in the direction of the axis line O during measurement of the combustion pressure and prevents an unnecessary load due to extension of the coupling member 180 in the direction of the axis line O from being applied to the pressure sensor, thus improving the measurement accuracy of the pressure sensor. According to the first embodiment, two bends folded in the axis direction OD are formed in the coupling member 180, in order to decrease the spring constant of the coupling member 180. The detailed structure of the coupling member 180 is described with reference to FIG. 3.

Figure 3:
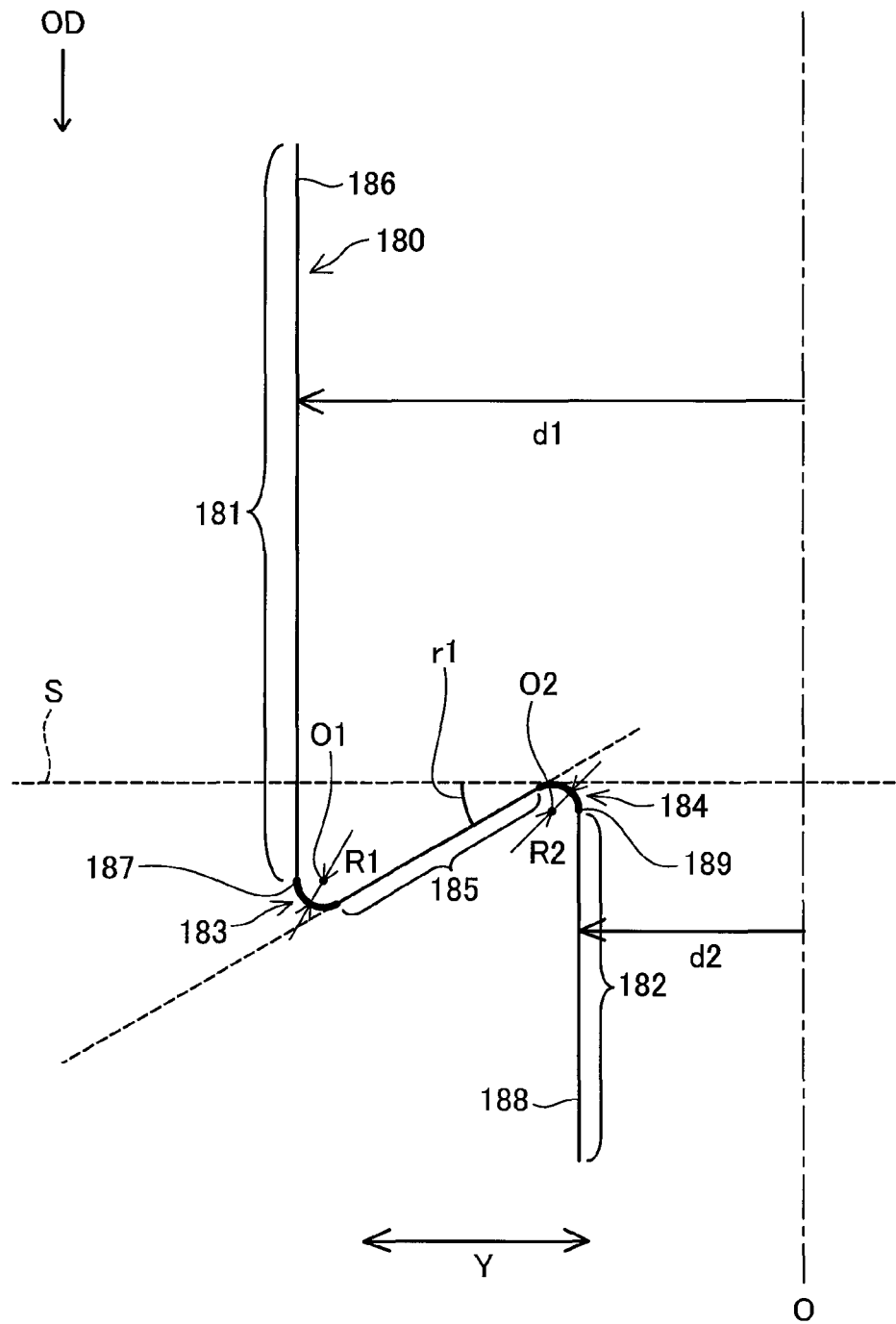
FIG. 3 is a schematic cross sectional view illustrating the detailed structure of the coupling member 180 according to the first embodiment.

FIG. 3 is a schematic cross sectional view illustrating the detailed structure of the coupling member 180 according to the first embodiment. The coupling member 180 located on the left side of the axis line O in the illustration of FIG. 2 is shown in FIG. 3 as a partially enlarged view. The coupling member 180 includes a first cylinder section 181, a second cylinder section 182, a first bend 183, a second bend 184 and a joint section 185. In the specification hereof, a radial direction means a radial direction of the metal shell 110 and is perpendicular to the axis line O. In the description, a side closer to the axis line O is specified as an inner side in the radial direction, and a side farther from the axis line O is specified as an outer side in the radial direction.

The first cylinder section 181 is welded to and connected with the housing 130 at the end 186 and is also connected with the first bend 183 at an end 187 to have a first outer diameter d1 and to be formed in a cylindrical shape along the axis line O. The second cylinder section 182 is welded to and connected with the heater unit 150 at the end 188 and is also connected with the second bend 184 at an end 189 to have a second outer diameter d2 that is smaller than the first outer diameter d1 and to be formed in a cylindrical shape along the axis line O. In the embodiment hereof, "along the axis line O" means a state parallel to the axis line O including a tolerance. Connection of the end 187 with the first bend 183 or connection of the end 189 with the second bend 184 means that the connected part is a boundary portion between respective structural components and does not mean bonding or adhesion.

The first bend 183 is connected with the end 187 of the first cylinder section 181 and is folded inward in a radial direction Y to be formed as a curved surface centering around a point O1 with a bend radius R1. The first bend 183 is located closer in the radial direction Y to the housing 130 than the second bend 184 and is located closer in the axis direction OD to the front end side of the housing 130 than the second bend 184.

The second bend 184 is connected with the end 189 of the second cylinder section 182 and is folded outward in the radial direction Y to be formed as a curved surface centering around a point O2 with a bend radius R2. The second bend 184 is located closer in the radial direction Y to the heater unit 150 than the first bend 183 and is located closer in the axis direction OD to the rear end side of the housing 130 than the first bend 183. The second bend 184 is bent convex in the opposite direction to the bend direction of the first bend 183.

The first bend 183 and the second bend 184 are connected by the joint section 185. Folding the first bend 183 and the second bend 184 in the opposite directions relative to the axis direction OD increases the length of the coupling member 180 by the length corresponding to the overlapped portion in the radial direction Y, so as to decrease the spring constant k of the coupling member 180.

The joint section 185 is formed in a tapered shape that reduces the diameter toward the rear end side of the metal shell 110. In other words, the joint section 185 is formed to have an inclination of a predetermined angle r1 to a plane that is in contact with the second bend 184 and is orthogonal to the axis line O (hereinafter referred to as reference plane S). The spring constant k of the coupling member 180 changes according to the angle r1 of the joint section 185. The relationship between the angle r1 of the joint section 185 to the reference plane S and the spring constant k is described with reference to FIG. 4.

Figure 4:
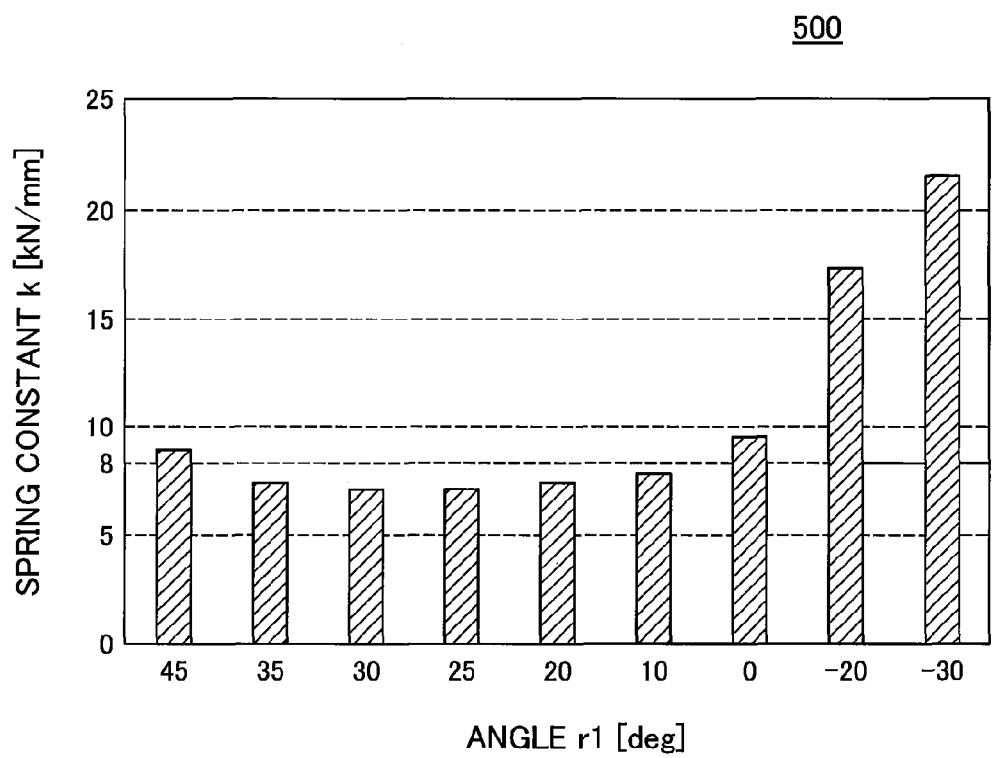
FIG. 4 is an angle-spring constant graph 500 according to the first embodiment.

FIG. 4 is an angle-spring constant graph 500 according to the first embodiment. The angle-spring constant graph 500 shows the relationship between the angle r1 of the joint section 185 to the reference plane S and the spring constant k of the coupling member 180 according to the first embodiment. In the angle-spring constant graph 500, the ordinate shows the spring constant k (unit: kN/mm) and the abscissa shows the angle r1 of the joint section 185 to the reference plane S (unit: deg). In the first embodiment, an inclination in a counter-clockwise direction to the reference plane S about a contact point between the reference plane S and the second bend 184 is shown by the positive sign (+), and an inclination in a clockwise direction to the reference plane S is shown by the negative sign (−).

As shown by the angle-spring constant graph 500, the spring constant k of the coupling member 180 in the case where the angle r1 of the joint section 185 to the reference plane S is in the range of Expression 1 given below is included in the range of not greater than 8 kN/mm and is relatively lower than the spring constant k in the case where the angle r1 of the joint section 185 is out of the range of Expression 1. Accordingly, the coupling member 180 is formed by defining the first bend 183 and the second bend 184 to cause the angle r1 of the joint section 185 to be included in the range of Expression 1. In the first embodiment, the coupling member 180 is formed to satisfy the angle r1=30°.

$$10°≤r≤35°$$ (Expression 1)

In the glow plug 100 of the embodiment, thickness (plate thickness) T1 of the first bend 183 of the coupling member 180 is greater than thickness (plate thickness) T2 of the second bend 184 (see FIG. 2). This configuration reduces the stress focused on the first bend 183 in the case of displacement of the heater unit 150 by a combustion pressure and optimizes the stress acting on the first bend 183 and the stress acting on the second bend 184, thus improving the durability of the coupling member 180. For example, from the above standpoint, the thickness T1 of the first bend 183 is preferably 1.15 to 1.35 times the thickness T2 of the second bend 184, is more preferably 1.2 to 1.3 times the thickness T2 and is furthermore preferably 1.25 times the thickness T2.

The coupling member 180 may be manufactured by various techniques such as drawing, cutting or casing, but is manufactured by the drawing (deep drawing) process according to the first embodiment. The drawing process has the advantages over the other techniques such as the cutting process or the casting process: reduced manufacturing time; reduced variations in shapes of the first bend 183 and the second bend 184; reduction of redundant materials (parts to be wasted after the manufacture); and high cost performance.

According to the first embodiment, the coupling member 180 is placed in the cap unit 120. The elastic force of the coupling member 180 allows for a displacement of the heater unit 150 along the axis line O. The coupling member 180 also serves to ensure the air tightness from a combustion chamber into the metal shell 110 by coupling the heater unit 150 with the housing 130.

The pressure sensor 160 (see FIG. 1B) includes: a ring-shaped metal diaphragm 162 having an opening 161 provided on the center to enable the center shaft 170 to pass through; and a piezoresistance element 164 joined with an upper face (face on the rear end side) of the metal diaphragm 162. The metal diaphragm 162 is made of, for example, stainless steel. The integrated circuit 166 placed at a specified position in the housing 130 is electrically connected with the piezoresistance element 164. As described previously, the rear end of the transmission sleeve 134 connected with the heater unit 150 is joined with the inner circumference of the metal diaphragm 162. When the heater unit 150 receives a combustion pressure and is displaced along the axis line O, the transmission sleeve 134 transmits the displacement amount to the metal diaphragm 162 and thereby bends the metal diaphragm 162. The integrated circuit 166 detects this deformation of the metal diaphragm 162 by using the piezoresistance element 164, so as to detect a combustion pressure of the internal combustion engine. The integrated circuit 166 outputs an electric signal representing this detected combustion pressure through the wirings 116 inserted at the rear end of the metal shell 110 to, for example, an external ECU.

According to the embodiment describe above, a tool is engaged with the tool engagement structure 112 of the glow plug 100, and the threaded section 114 is screwed to a plug mounting hole 200 of the internal combustion engine. This brings the cap unit 120 into contact with a bearing surface 210 of the plug mounting hole 200 and fixes the glow plug 100 to the internal combustion engine.

A2. Production Method of Coupling Member 180

The glow plug 100 of the first embodiment is manufactured by producing and assembling the respective constituent members of the glow plug 100 (metal shell 110, cap unit 120, heater unit 150, pressure sensor 160 and coupling member 180). The coupling member 180 of the first embodiment is manufactured by the deep drawing process through the multi-stage drawing processes.

In the glow plug 100 of the first embodiment described above, the coupling member 180 includes the first bend 183 and the second bend 184 respectively folded in the axis direction OD, and the joint section 185 in the tapered shape configured to connect the first bend 183 with the second bend 184 and reduce the diameter toward the rear end side of the body portion. In the limited space formed between the housing 130 and the heater unit 150, this configuration increases the length of the coupling member 180, compared with a configuration without any bend folded in the axis direction OD. This results in decreasing the spring constant k of the coupling member 180 and suppressing thermal expansion and the resulting extension of the coupling member 180 in the axis direction. This accordingly prevents an unnecessary load due to the extension of the coupling member 180 in the axis direction from being applied to the pressure sensor 160 via the heater unit 150 and improves the measurement accuracy of the pressure sensor 160.

In the glow plug 100 of the first embodiment, the second bend 184 is bent in the opposite direction to the bend direction of the first bend 183. This simple configuration enables an increase in length of the coupling member 180 and a decrease in spring constant k of the coupling member 180.

In the glow plug 100 of the first embodiment, the coupling member 180 includes the first cylinder section that has the first outer diameter and is formed in the cylindrical shape along the axis direction OD, and the second cylinder section that has the second outer diameter smaller than the first outer diameter and is formed in the cylindrical shape along the axis direction OD. The coupling member 180 is accordingly formed in a Z shape where the cross section along the axis direction OD is inclined at 90 degrees to the axis line O. This configuration relatively reduces the size of the coupling member 180 and thereby increases the flexibility in design of the glow plug with the pressure sensor.

In the glow plug 100 of the first embodiment, the joint section 185 is formed to have an inclination of not less than 10 degrees but less than 35 degrees to the reference plane that is in contact with the second bend 184 and is orthogonal to the axis line O. This configuration decreases the spring constant k of the coupling member 180, compared with the coupling member 180 where the angle of the joint section 185 to the reference plane S is less than 10 degrees or is equal to or greater than 35 degrees. This results in improving the measurement accuracy of the pressure sensor 160.

In the glow plug 100 of the first embodiment, the coupling member 180 is manufactured by the drawing process. This improves the cost performance in manufacture of the coupling member 180 and ensures manufacture of the coupling member 180 of the stable quality with a less variation in shapes of the first bend 183, the second bend 184 and the joint section 185.

B. Second Embodiment

According to a second embodiment, the coupling member is formed such that the bend radius of a first bend is greater than the bend radius of a second bend. In a glow plug 100a of the second embodiment, structural components other than a coupling member 180a are similar to those of the first embodiment and are thus expressed by the same numerals and symbols as those of the first embodiment and are not described in detail.

B1. Structure of Coupling Member

Figure 5:
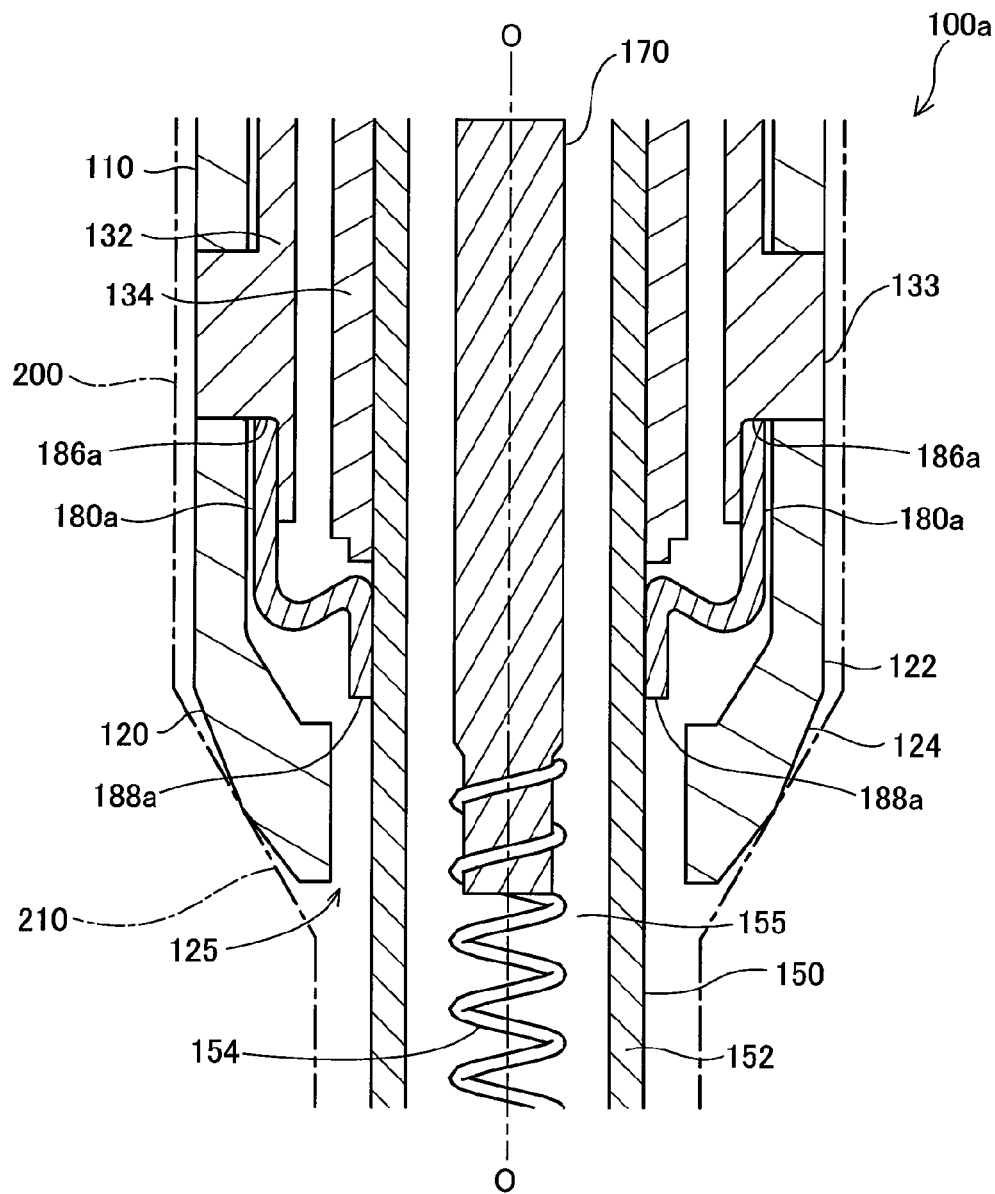
FIG. 5 is an enlarged cross sectional view of the neighborhood of a cap unit 120 of the glow plug 100a according to the second embodiment.

FIG. 5 is an enlarged cross sectional view of the neighborhood of a cap unit 120 of the glow plug 100a according to the second embodiment. The coupling member 180a includes a first cylinder section 181a, a second cylinder section 182a, a first bend 183a, a second bend 184a and a joint section 185a. The coupling member 180a is connected at an end 186a with the housing 130 and is connected with a heater unit 150 at a different end 188a that is different from the end 186a, so as to enable movement of the heater unit 150 along the axis line O and couple the heater unit 150 with the housing 130. The coupling member 180a is made of, for example, stainless steel or a nickel alloy in a thin film shape to have elasticity.

Figure 6:
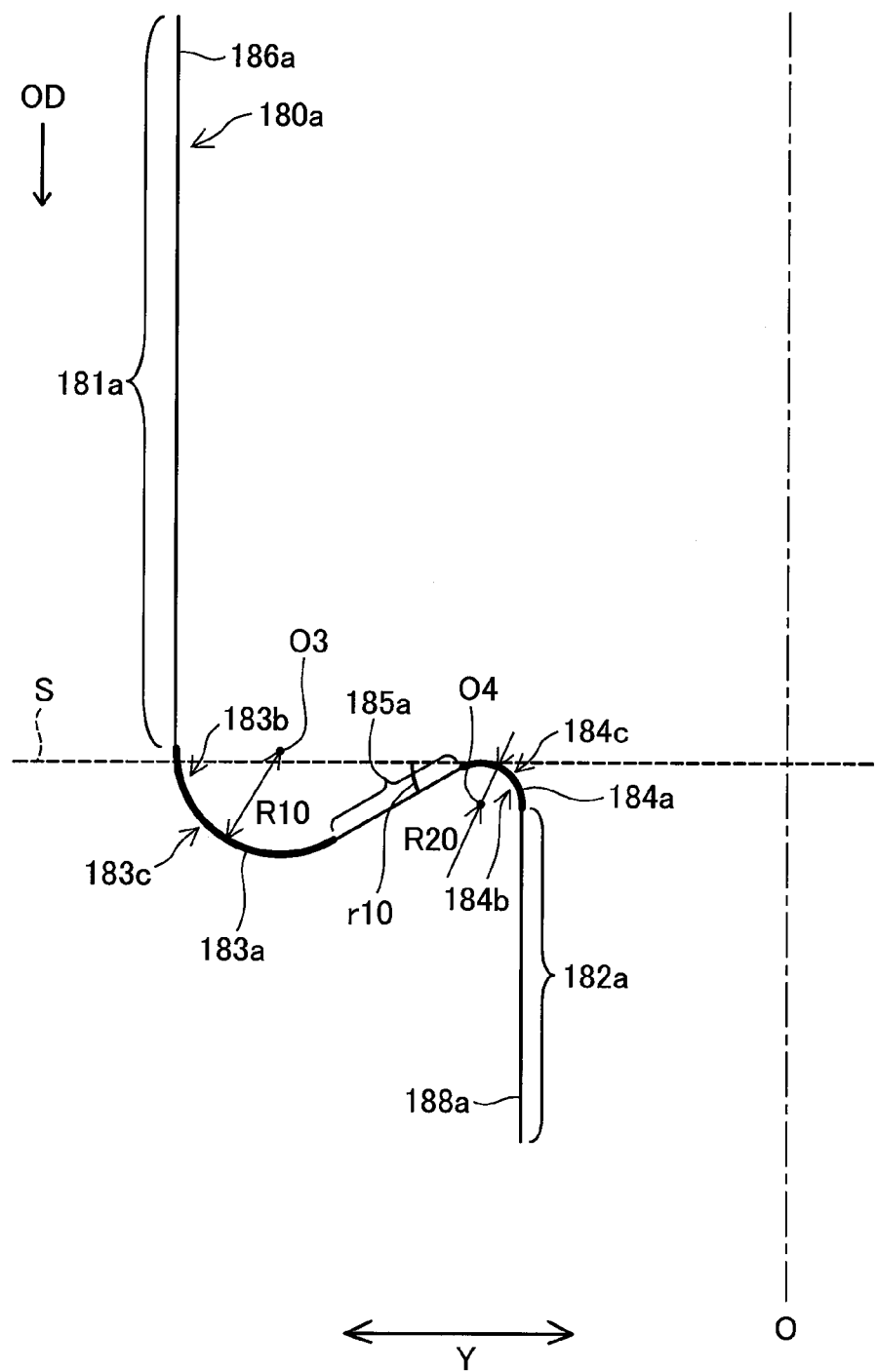
FIG. 6 is a schematic cross sectional view illustrating the detailed structure of the coupling member 180a according to the second embodiment.

FIG. 6 is a schematic cross sectional view illustrating the detailed structure of the coupling member 180a according to the second embodiment. In FIG. 6, the first bend 183a and the second bend 184a are shown by thick solid lines. A point O3 represents the bend center of the first bend 183a and a point O4 represents the bend center of the second bend 184a. The coupling member 180a has the similar configuration and effects to those of the coupling member 180 of the first embodiment, except different bend radii of the first bend 183a and the second bend 184a.

The first bend 183a is formed as a curved surface centering around the point O3 with a bend radius R10. The second bend 184a is formed as a curved surface with a bend radius R20. The bend radius R10 of the first bend 183a is greater than the bend radius R20 of the second bend 184a. According to the second embodiment, the bend radius R10 of the first bend 183a is 0.5 mm, and the bend radius R20 of the second bend 184a is 0.2 mm.

The joint section 185a is inclined at an angle r10 to the reference plane S. The angle r10 may be any angle included in the range of Expression 1 described in the first embodiment and satisfies the angle r10=30° in the second embodiment.

In the coupling member 180 of the first embodiment, the first bend 183 and the second bend 184 are formed to be folded in the axis direction OD, so as to decrease the spring constant k of the coupling member 180. The decrease in spring constant, however, causes a problem of reduced durability. It is experimentally known that the coupling member 180 of the first embodiment has a large stress or especially a large compression stress acting on the first bend 183 located outside in the radial direction.

In the coupling member 180a of the second embodiment, the bend radius R10 of the first bend 183a is increased to distribute and reduce the stress acting on the first bend 183a, so as to improve the durability of the coupling member 180a. The compression stress acts on an inner circumferential side 183b of the first bend 183a and an inner circumferential side 184b of the second bend 184a, while the tensile stress acts on an outer circumferential side 183c of the first bend 183a and an outer circumferential side 184c of the second bend 184a. The following describes the correlation of the bend radius R10 of the first bend 183a to the spring constant k of the coupling member 180a, the correlation of the bend radius R10 of the first bend 183a to the stress acting on the coupling member 180a, and the comparison in measurement performance of the pressure sensor between the glow plug 100a using the coupling member 180a according to the second embodiment and glow plugs using coupling members of prior art examples.

B2. Correlation of Bend Radius R10 to Spring Constant k

Figure 7:
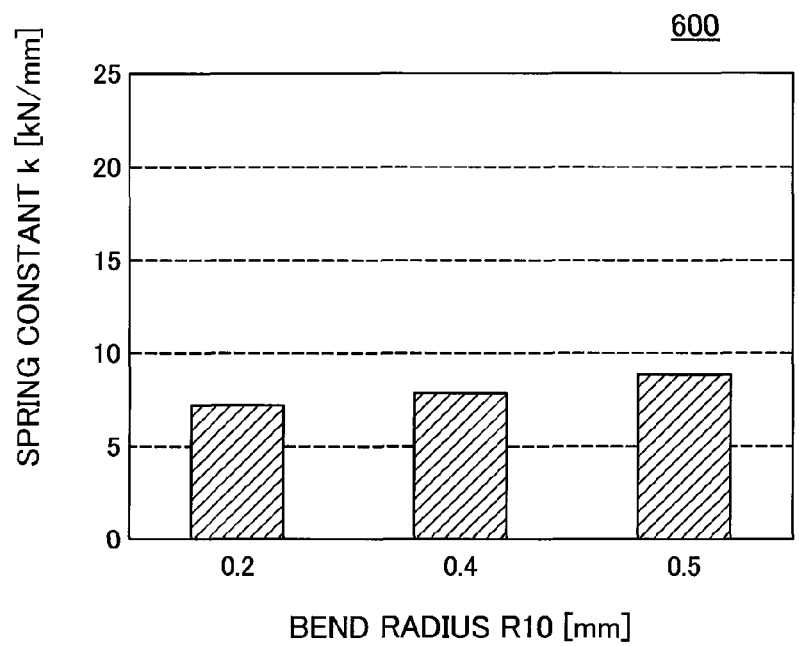
FIG. 7 is a bend radius-spring constant graph 600 according to the second embodiment.

FIG. 7 is a bend radius-spring constant graph 600 according to the second embodiment. The bend radius-spring constant graph 600 shows the relationship between the bend radius R10 of the first bend 183a and the spring constant k of the coupling member 180a. In the bend radius-spring constant graph 600, the ordinate shows the spring constant k (unit: kN/mm) and the abscissa shows the bend radius R10 (unit: mm) of the first bend 183a.

It is experimentally known that the spring constant k of the coupling member 180a equal to or less than 15 kN/mm in the glow plug 100a ensures the sufficient measurement accuracy of the pressure sensor 160. As shown in the bend radius-spring constant graph 600, the spring constant k tends to increase with an increase in bend radius R10. The spring constant k of the coupling member 180a at the bend radius R10=0.5 mm is, however, not greater than 10 kN/mm, which is a relatively small value that does not affect the measurement accuracy.

B3. Correlation of Bend Radius R10 to Stress Acting on Coupling Member 180a

Figure 8:
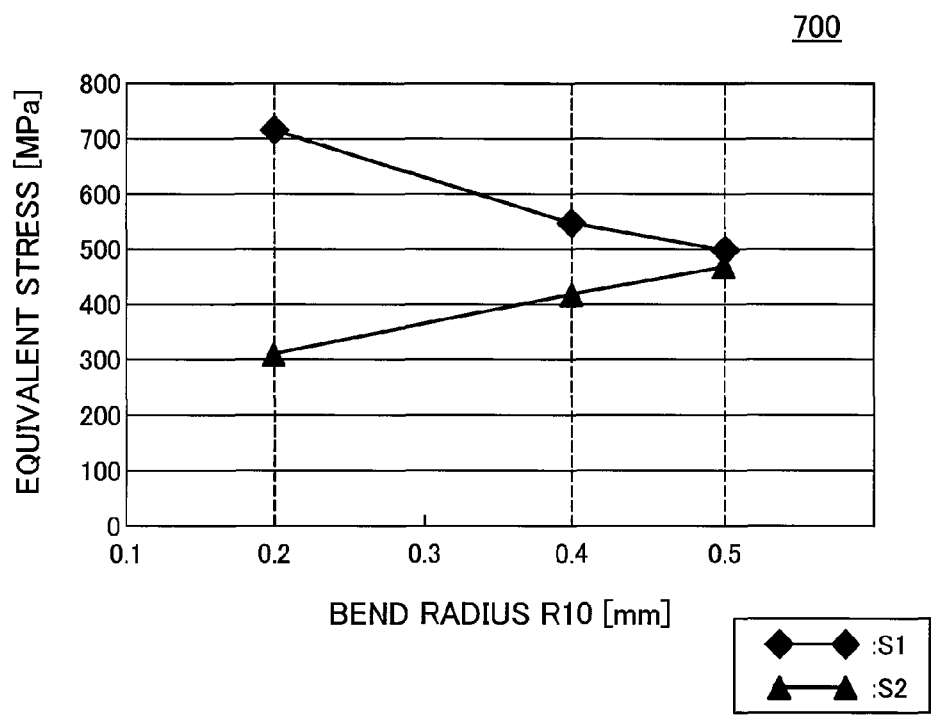
FIG. 8 is a bend radius-stress graph 700 according to the second embodiment.

FIG. 8 is a bend radius-stress graph 700 according to the second embodiment. The bend radius-stress graph 700 shows the correlation of the bend radius R10 of the first bend 183a to the stresses acting on the first bend 183a and the second bend 184a. In the bend radius-stress graph 700, the ordinate shows the equivalent stress (unit: MPa) and the abscissa shows the bend radius R10 (unit: mm) of the first bend 183a. In the bend radius-stress graph 700, a line graph S1 shows a change in equivalent stress acting on the first bend 183a, and a line graph S2 shows a change in equivalent stress acting on the second bend 184a.

It is experimentally known that the coupling member having the first bend and the second bend folded in the axis direction (e.g., coupling member 180 of the first embodiment or coupling member 180a of the second embodiment) has the sufficient durability against the combustion pressure when the equivalent stress acting on the coupling member 180 is not greater than 600 MPa. As shown by the line graph S2 in the bend radius-stress graph 700, when the bend radius R10≤0.5 mm, the equivalent stress acting on the second bend 184a is not greater than 600 MPa. As shown by the line graph S1, on the other hand, the equivalent stress acting on the first bend 183a decreases with an increase in bend radius R10 of the first bend 183a, but the equivalent stress acting on the first bend 183a is not less than 600 MPa in the range of the bend radius R10<0.4 mm of the first bend 183a. The bend radius R10<0.4 mm of the first bend 183a may accordingly cause the poor durability performance of the coupling member 180 against the combustion pressure and may damage the coupling member 180.

According to the second embodiment, the bend radius R10 of the first bend 183a is set to 0.5 mm and the bend radius R20 of the second bend 184a is set to 0.2 mm, such that the equivalent stresses acting on the first bend 183a and the second bend 184a are not greater than 600 MPa.

The equivalent stress acting on the second bend 184a tends to increase in an increase in bend radius R10 of the first bend 183a. The bend radius R10 of the first bend 183a in the range of R10≤0.5 mm causes the compression stress acting on the second bend 184a to be not greater than 600 MPa and ensures the durability of the coupling member 180.

B4. Comparison in Measurement Performance of Pressure Sensor

The results of comparison in measurement performance of the pressure sensor between the glow plug 100a using the coupling member 180a according to the second embodiment and glow plugs using coupling members of prior art examples are described with reference to FIGS. 9A to 12.

Figure 9A:
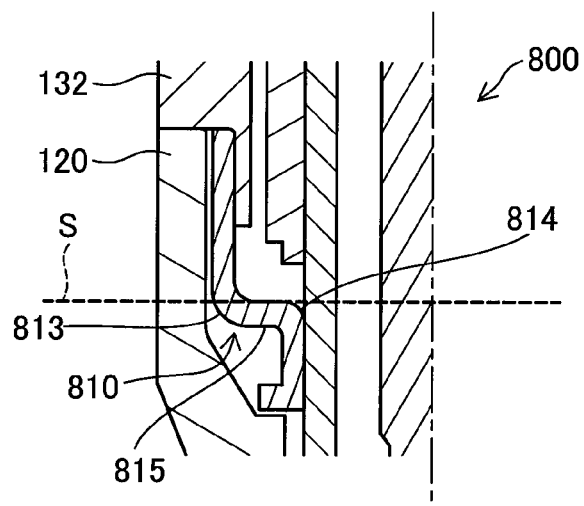
FIG. 9A is a cross sectional view illustrating glow plugs of prior art examples.
Figure 9B:
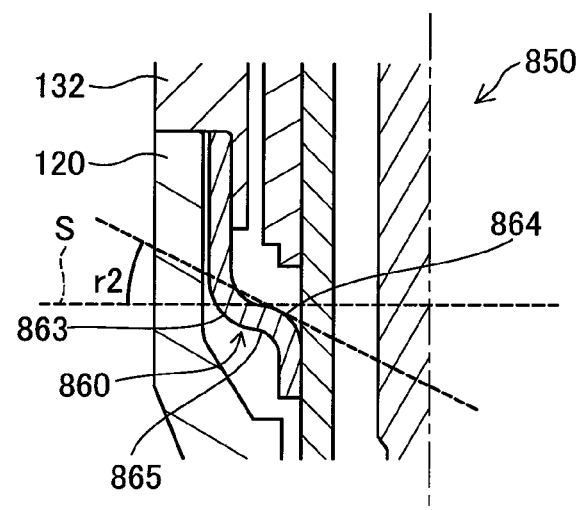
FIG. 9B is a cross sectional view illustrating glow plugs of prior art examples.

FIGS. 9A and 9B are cross sectional views illustrating glow plugs of prior art examples. FIG. 9A is a partial enlarged view of the neighborhood of a coupling member 810 of a glow plug 800 according to Prior Art Example 1. FIG. 9B is a partial enlarged view of the neighborhood of a coupling member 860 of a glow plug 850 according to Prior Art Example 2.

As shown in FIG. 9A, the coupling member 810 of Prior Art Example 1 includes a first bend 813, a second bend 814 and a joint section 815 configured to connect the first bend 813 with the second bend 814. The joint section of the coupling member 810 is parallel to the reference plane S, i.e., has an angle 0° to the reference plane S (has no inclination).

As shown in FIG. 9B, the coupling member 860 of Prior Art Example 2 includes a first bend 863, a second bend 864 and a joint section 865 configured to connect the first bend 863 with the second bend 864. The joint section 865 is formed to have an angle (inclination) r2 of −20° to the reference plane S. In other words, the first bend 863 and the second bend 864 are not folded in the axis direction OD, and the joint section 865 is formed in a tapered shape that reduces the diameter toward the front end of the glow plug 850.

Figure 10:
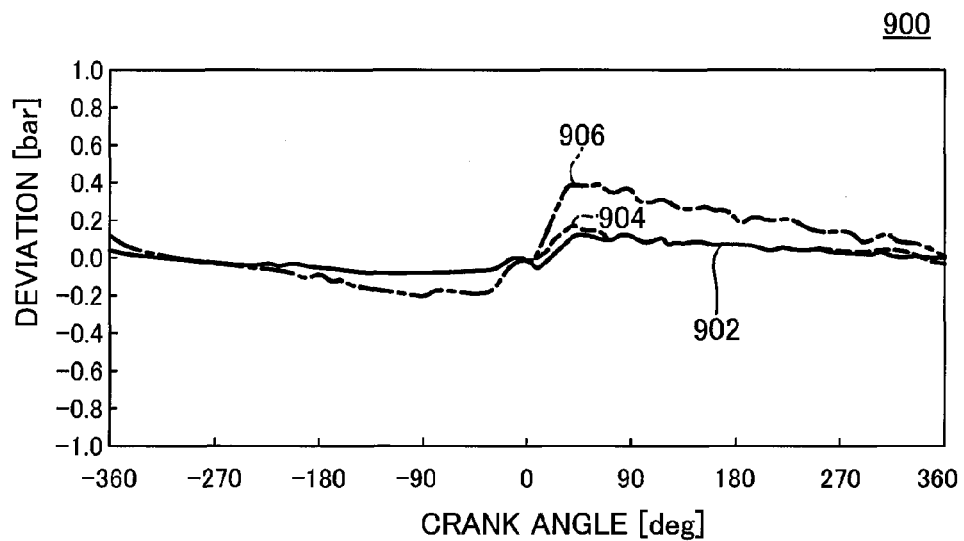
FIG. 10 is a deviation graph 900 showing the measurement deviation of pressure sensors in an engine test.

FIG. 10 is a deviation graph 900 showing the measurement deviation of pressure sensors in an engine test. A single-cylinder test engine is employed for this engine test. In the deviation graph 900, the ordinate shows the deviation (unit: bar) of the measured pressure, and the abscissa shows the crank angle (unit: deg) of the single-cylinder engine. In the deviation graph 900, an deviation curve 902 of the solid line shows a measurement deviation of combustion pressure of a pressure sensor in the glow plug 100a using the coupling member 180a according to the second embodiment. An deviation curve 904 of the broken line shows a measurement deviation of combustion pressure of a pressure sensor in the glow plug 800 shown in FIG. 9A. An deviation curve 906 of the dot-dash line shows a measurement deviation of combustion pressure of a pressure sensor in the glow plug 850 shown in FIG. 9B.

As shown by the deviation graph 900, the measurement deviation of the glow plug 100a of the second embodiment and the glow plug 800 of Prior Art Example 1 are in the range of relatively small deviation of about ±0.1 bar.

Figure 11A:
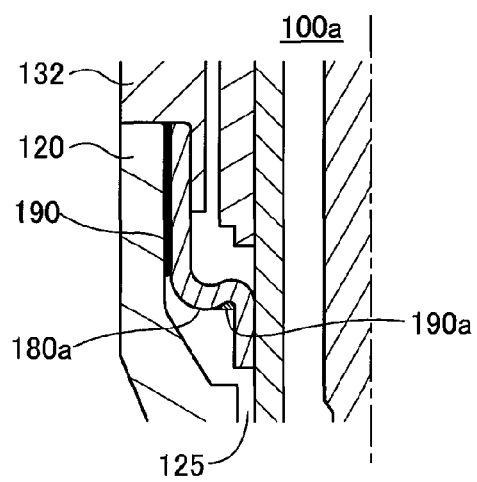
FIG. 11A is a diagram illustrating soot-clogging states of the glow plug 100a of the second embodiment and the glow plugs 800 and 850 of Prior Art Examples 1 and 2.
Figure 11B:
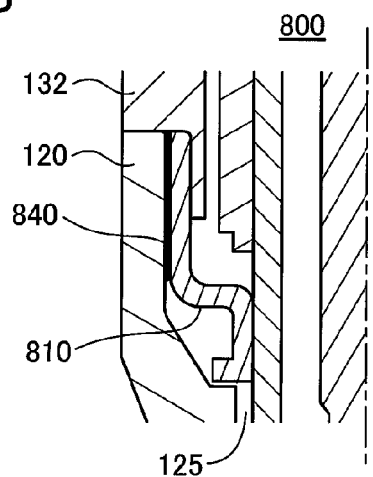
FIG. 11B is a diagram illustrating soot-clogging states of the glow plug 100a of the second embodiment and the glow plugs 800 and 850 of Prior Art Examples 1 and 2.
Figure 11C:
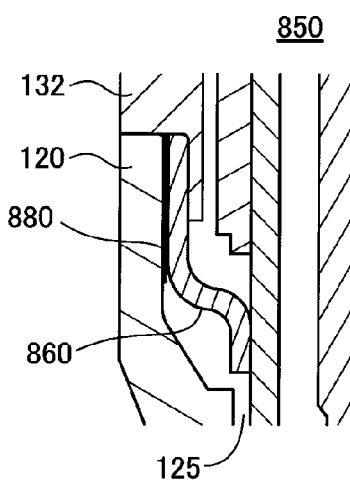
FIG. 11C is a diagram illustrating soot-clogging states of the glow plug 100a of the second embodiment and the glow plugs 800 and 850 of Prior Art Examples 1 and 2.

FIGS. 11A to 11C are diagrams illustrating soot-clogging states of the glow plug 100a of the second embodiment and the glow plugs 800 and 850 of Prior Art Examples 1 and 2. FIG. 11A shows a soot-clog in the glow plug 100a, FIG. 11B shows a soot-clog in the glow plug 800 and FIG. 11C shows a soot-clog in the glow plug 850. In any of the glow plugs 100a, 800 and 850, on start of combustion in an internal combustion engine, soot in a combustion chamber enters inside of the cap unit 120 via the opening 125. This causes a soot-clog 190, 840 or 880 between the coupling member 180a, 810 or 860 and the cap unit 120 as shown in FIGS. 11A to 11C. The soot-clog interferes with the elasticity of the coupling member and makes a possible cause of degradation of the pressure sensor.

Figure 12:
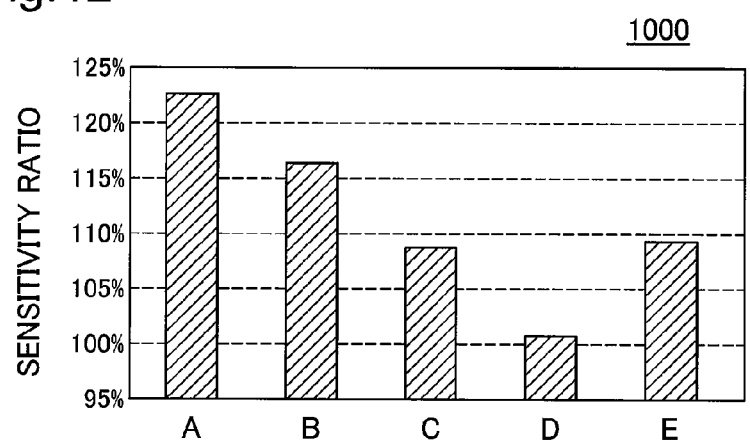
FIG. 12 is a sensitivity ratio graph 1000 showing the sensitivity ratios of the pressure sensors.

FIG. 12 is a sensitivity ratio graph 1000 showing the sensitivity ratios of the pressure sensors. The sensitivity ratio graph 1000 shows the sensitivity ratios of the pressure sensors in the soot-clogging states of the glow plug 100a of the second embodiment and the glow plugs 800 and 850 of the prior art examples. In the sensitivity ratio graph 1000, the ordinate shows the sensitivity ratio (unit: %) to the sensitivity 100% of the pressure sensor in the no soot-clogging state. In the sensitivity ratio graph 1000, a bar graph A shows the sensitivity ratio of the glow plug 800 of Prior Art Example 1, a bar graph B shows the sensitivity ratio of the glow plug 850 of Prior Art Example 2, and a bar graph C shows the sensitivity ratio of the glow plug 100a of the second embodiment. A bar graph D shows the sensitivity ratio when only a soot-clog 190a (see FIG. 11A) occurs in a recess of the second bend 184a of the glow plug 100a according to the second embodiment. A bar graph E shows the sensitivity ratio when both the soot-clogs 190 and 190a occur in the glow plug 100a.

As shown by the bar graphs A, B and C in the sensitivity ratio graph 1000, the glow plug 100a of the second embodiment has the lower sensitivity ratio in the soot-clogging state (i.e., the smaller variation in sensitivity) than those of the glow plugs 800 and 850 of the prior art examples. This leads to the smaller measurement deviation of the pressure sensor and thereby improves the measurement performance.

In either case of the occurrence of only the soot-clog 190a and the occurrence of both the soot-clogs 190 and 190a as shown by the bar graphs D and E in the sensitivity ratio graph 1000, the glow plug 100a of the second embodiment has the sensitivity ratio of the pressure sensor that is less than 110% (i.e., the variation in sensitivity that is less than +10%). In other words, the glow plug 100a has relatively little effects of the position and the amount of soot-clog on the sensitivity and thereby maintains the measurement performance of the pressure sensor at the high level over a long term.

In the glow plug 100a of the second embodiment described above, the first bend 183a is formed to have the greater bend radius R10 than the bend radius R20 of the second bend 184a. Accordingly, this configuration reduces the stress acting on the coupling member, compared with the coupling member formed to have substantially no difference in bend radius between the first bend 183a and the second bend 184a or the coupling member formed to have the first bend of the smaller bend radius than the bend radius of the second bend. This arrangement suppresses degradation of the durability of the coupling member accompanied with a decrease in spring constant of the coupling member, thus improving the durability of the coupling member and thereby the durability of the pressure sensor, along with improvement in measurement accuracy of the pressure sensor.

C. Modification

The first cylinder section 181 and the second cylinder section 182 of the coupling member 180 of the first embodiment and the first cylinder section 181a and the second cylinder section 182a of the coupling member 180a of the second embodiment are formed to be parallel to the axis line O. As long as the first bend 183 or 183a and the second bend 184 or 184a are formed to be folded in the axis direction, the first cylinder section 181 or 181a and the second cylinder section 182 or 182a may be formed to be inclined to the axis line O.

The foregoing describes the various embodiments of the invention. The invention is, however, not limited to these embodiments, but a multiplicity of variations and modifications may be made to the embodiments without departing from the scope of the invention. For example, the heater including the sheath tube 152, the heating coil 154 and the insulating powder 155 is employed for the heater unit 150 in the above embodiments, but a ceramic heater may be used alternatively. In this application, an assembly of a ceramic heater and a metal outer cylinder in a tubular shape fixed to the outer circumferential face of the ceramic heater may be employed for the heater unit 150, and the coupling member 180 is connected with the outer cylinder. The combustion pressure is detected by using the piezoresistance element 164 in the above embodiments, but the combustion pressure may be detected by another sensor. For example, a piezoelectric element may be used to detect the combustion pressure. In this application, employed may be a configuration where a piezoelectric element is placed between the sensor fixation member 132 and the transmission sleeve 134 in the axis direction.

REFERENCE SIGNS LIST

100 . . . glow plug
100a . . . glow plug
110 . . . metal shell
112 . . . tool engagement structure
114 . . . threaded section
116 . . . wiring
120 . . . cap unit
122 . . . cylindrical section
124 . . . tapered section
125 . . . opening
130 . . . housing
132 . . . sensor fixation member
133 . . . flange
134 . . . transmission sleeve
150 . . . heater unit
152 . . . sheath tube
154 . . . heating coil
155 . . . insulating powder
156 . . . seal member
160 . . . pressure sensor
161 . . . opening
162 . . . metal diaphragm
164 . . . piezoresistance element
166 . . . integrated circuit
170 . . . center shaft
180 . . . coupling member
180a . . . coupling member
181 . . . first cylinder section
181a . . . first cylinder section
182 . . . second cylinder section
182a . . . second cylinder section
183 . . . first bend
183a . . . first bend
184 . . . second bend
184a . . . second bend
185 . . . joint section
185a . . . joint section
186 . . . end
186a . . . end
187 . . . end
188 . . . end
188a . . . end
189 . . . end
200 . . . hole
210 . . . bearing surface
800 . . . glow plug
810 . . . coupling member
813 . . . first bend
814 . . . second bend
815 . . . joint section
850 . . . glow plug
860 . . . coupling member
863 . . . first bend
864 . . . second bend
865 . . . joint section
900 . . . deviation graph
902 . . . deviation curve 904 . . . deviation curve
906 . . . deviation curve
1000 . . . sensitivity ratio graph

The invention claimed is:

1. A glow plug with a pressure sensor comprising:
a housing in a cylindrical shape that is extended in a direction of an axis line;
a heater unit in a rod shape that has a rear end part placed in the housing and a front end part protruded from a front end of the housing and is movable along the direction of the axis line;
a coupling member in a thin film shape that is connected at one end with the housing and at the other end with the heater unit and is configured to enable the heater unit to move along the direction of the axis line and couple the heater unit with the housing; and
a pressure sensor that detects a pressure based on a load transmitted via the heater unit, wherein
the coupling member includes:
a first bend and a second bend folded in the direction of the axis line; and
a joint section in a tapered shape configured to connect the first bend with the second bend and reduce diameter toward a rear end side of the housing, wherein
the first bend is located closer in a direction orthogonal to the axis line to the housing than the second bend and is located closer in the direction of the axis line to a front end side of the housing than the second bend, and
the first bend has a greater bend radius than a bend radius of the second bend.

2. The glow plug with the pressure sensor according to claim 1, wherein the second bend is bent in an opposite direction to a bend direction of the first bend.

3. The glow plug with the pressure sensor according to claim 1, wherein the coupling member further includes:
a first cylinder section connected with the housing, configured to have a first outer diameter and formed in a cylindrical shape along the direction of the axis line; and
a second cylinder section connected with the heater unit, configured to have a second outer diameter that is smaller than the first outer diameter and formed in a cylindrical shape along the direction of the axis line, wherein
when a side of the axis line is specified as inward and an opposite side to the axis line is specified as outward in a radial direction orthogonal to the axis line,
the first bend is formed to be connected with an opposite end of the first cylinder section that is opposite to an end connected with the housing and to be folded inward in the radial direction, and
the second bend is formed to be connected with an opposite end of the second cylinder section that is opposite to an end connected with the heater unit and to be folded outward in the radial direction.

4. The glow plug with the pressure sensor according to claim 1, wherein
the joint section has an inclination equal to or greater than 10 degrees to a reference plane that is in contact with the second bend and is orthogonal to the axis line.

5. The glow plug with the pressure sensor according to claim 4, wherein the joint section has an inclination equal to or less than 35 degrees to the reference plane.

6. The glow plug with the pressure sensor according to claim 1, wherein
the first bend has a greater thickness than a thickness of the second bend.

7. The glow plug with the pressure sensor according to claim 1, wherein
the coupling member is formed by a drawing process.

* * * * *